United States Patent
Zhu et al.

(10) Patent No.: US 12,449,309 B2
(45) Date of Patent: Oct. 21, 2025

(54) METHODS FOR DETECTION USING OPTICAL EMISSION SPECTROSCOPY

(71) Applicant: Applied Materials, Inc., Santa Clara, CA (US)

(72) Inventors: Zuoming Zhu, Sunnyvale, CA (US); Martin A. Hilkene, Gilroy, CA (US); Avinash Shervegar, Karnataka (IN); Surendra Singh Srivastava, Santa Clara, CA (US); Ala Moradian, Sunnyvale, CA (US); Shu-Kwan Lau, Sunnyvale, CA (US); Zhiyuan Ye, San Jose, CA (US); Enle Choo, Saratoga, CA (US); Flora Fong-Song Chang, Saratoga, CA (US); Bindusagar Marath Sankarathodi, San Jose, CA (US); Patricia M. Liu, Saratoga, CA (US); Errol Antonio C. Sanchez, Tracy, CA (US); Jenny Lin, Saratoga, CA (US); Nyi O. Myo, San Jose, CA (US); Schubert S. Chu, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 683 days.

(21) Appl. No.: 17/630,235

(22) PCT Filed: Jul. 8, 2020

(86) PCT No.: PCT/US2020/041172
§ 371 (c)(1),
(2) Date: Jan. 26, 2022

(87) PCT Pub. No.: WO2021/025819
PCT Pub. Date: Feb. 11, 2021

(65) Prior Publication Data
US 2022/0283029 A1 Sep. 8, 2022

(30) Foreign Application Priority Data

Aug. 6, 2019 (IN) ............................ 201941031810

(51) Int. Cl.
C23C 16/455 (2006.01)
G01J 3/443 (2006.01)

(52) U.S. Cl.
CPC ........ *G01J 3/443* (2013.01); *C23C 16/45502* (2013.01); *C23C 16/45527* (2013.01)

(58) Field of Classification Search
CPC .................... C23C 16/45502; C23C 16/45527
See application file for complete search history.

(56) References Cited

U.S. PATENT DOCUMENTS

| | | | | |
|---|---|---|---|---|
| 5,187,542 A | * | 2/1993 | Madzsar | G01N 17/00 356/311 |
| 5,340,976 A | * | 8/1994 | Taniguchi | G01T 1/28 250/459.1 |

(Continued)

FOREIGN PATENT DOCUMENTS

| | | | | |
|---|---|---|---|---|
| JP | 56-117152 | * | 9/1981 | G01N 21/76 |
| JP | 2003-282546 | * | 10/2003 | H01L 21/3065 |

(Continued)

OTHER PUBLICATIONS

Schmitt, S.W., et al., "Chemical and optical characterisation of atomic layer deposition aluminium doped ZnO films for photovoltaics by glow discharge optical emission spectrometry". J. Anal. At. Spectrom., 2011, 26, 822-827.*

(Continued)

*Primary Examiner* — Bret P Chen
(74) *Attorney, Agent, or Firm* — Patterson + Sheridan, LLP (57) ABSTRACT

Methods for detection using optical emission spectroscopy in which an optical signal is delivered from the process (Continued)

chamber to an optical emission spectrometer (OES). The OES identifies emission peaks of photons, which corresponds to the optical intensity of radiation from the photons, to determine the concentrations of each of the precursor gases and reaction products. The OES sends input signals of the data results to a controller. The controller can adjust process variables within the process chamber in real time during deposition based on the comparison. In other embodiments, the controller can automatically trigger a process chamber clean based on a comparison of input signals of process chamber residues received before the deposition process and input signals of process chamber residues received after the deposition process.

20 Claims, 7 Drawing Sheets (56) References Cited

U.S. PATENT DOCUMENTS

| | | | | |
|---|---|---|---|---|
| 5,986,747 | A * | 11/1999 | Moran | G01N 21/68 216/60 |
| 6,790,376 | B1 * | 9/2004 | Markle | H01L 21/67253 216/84 |
| 8,963,765 | B1 * | 2/2015 | Pedersen | G01S 7/41 342/13 |
| 2003/0049376 | A1 * | 3/2003 | Schwarm | G05B 19/00 427/255.28 |
| 2003/0159711 | A1 | 8/2003 | Blonigan et al. | |
| 2004/0235303 | A1 | 11/2004 | Wong et al. | |
| 2006/0287753 | A1 | 12/2006 | Plumhoff | |
| 2007/0064227 | A1 | 3/2007 | Powell et al. | |
| 2008/0182397 | A1 * | 7/2008 | Lam | H01L 21/02529 438/607 |
| 2010/0190353 | A1 | 7/2010 | Nguyen et al. | |
| 2011/0146378 | A1 * | 6/2011 | Brand | G01N 21/766 73/23.31 |
| 2011/0265884 | A1 * | 11/2011 | Xu | H01L 21/6719 137/565.23 |
| 2017/0254755 | A1 * | 9/2017 | Cho | G01J 3/0208 |

FOREIGN PATENT DOCUMENTS

| | | | | |
|---|---|---|---|---|
| WO | WO 02/23611 | A2 * | 3/2002 | H01L 21/3065 |
| WO | WO 03/079411 | A2 * | 9/2003 | H01L 21/00 |

OTHER PUBLICATIONS

Granier, A., et al., "Optical emission spectra of TEOS and HMDSO derived plasmas used for thin film deposition". Plasma Sources Science and Technology, 2003, 12, pp. 89-96.*

Mackus, A.J.M., et al., "Optical emission spectroscopy as a tool for studying, optimizing, and monitoring plasma-assisted atomic layer deposition processes". J. Vac. Sci. Technol. A 28(1), Jan./Feb. 2010, 77-87.*

McMeekin, Samuel G., et al., "Emission spectroscopy using a photoresistor as a light detector". Journal of Chemical Education, vol. 47, Issue 12, pp. 832-834.*

De la Huerta, Cesar Masse, et al., "Influence of the Geometric Parameters on the Deposition Mode in Spatial Atomic Layer Deposition: A Novel Approach to Area-Selective Deposition". Coatings, 2019, 9, 5, pp. 1-14.*

Michalet, X., et al., "New photon-counting detectors for single-molecule fluorescence spectroscopy and imaging". Proc SPIE. May 13, 2011; 8033, pp. 1-21.*

International Search Report dated Nov. 5, 2021 for Application No. PCT/US2020/041172.

* cited by examiner

METHODS FOR DETECTION USING OPTICAL EMISSION SPECTROSCOPY

BACKGROUND

Field

One or more embodiments described herein generally relate to methods for detection in semiconductor processes, and more particularly, to methods for detection using optical emission spectroscopy.

Description of the Related Art

Substrates are processed for a wide variety of applications, including the fabrication of integrated devices and microdevices. One method of processing substrates includes depositing a material, such as a semiconductor material or a conductive material on an upper surface of a substrate. For example, epitaxy is one deposition process that deposits films of various materials on a surface of a substrate in a process chamber. Epitaxy processes are able to produce such high-quality films on substrates through chemical gas precursors' reactions under certain process conditions within the process chamber. Examples of process conditions are temperature, pressure, and precursor flow rates.

The concentrations of gas precursors and reaction byproducts during deposition affect film properties. Each of the process conditions within the process chamber discussed above affect the concentration of gas precursors and the reaction byproducts. As such, the process conditions often need to be changed to achieve the desired concentrations of gas precursors and reaction byproducts. However, detection of the gas precursors and reaction byproducts is often difficult, making it difficult to change the process conditions. Process chambers are often inspected and tested by opening the process chamber and manually inspecting the components. However, this kind of inspection and testing is timely and often requires the process chamber be taken out of production, requiring the process chamber to be flushed and completely cooled followed by a long recovery process.

Accordingly, there is a need for methods for detection and correction of gas precursors, reaction products, and residues in epitaxial chambers.

SUMMARY

One or more embodiments herein relate to methods for detection using optical emission spectroscopy.

In one embodiment, a method for adjusting process variables within a process chamber includes flowing one or more precursors into the process chamber; performing a deposition process within the process chamber; emitting photons from the process chamber to an optical emission spectrometer; identifying emission peaks with the optical emission spectrometer; sending input signals from the optical emission spectrometer to a controller; comparing the input signals to stored values using the controller; and adjusting process variables within the process chamber based on the comparison.

In another embodiment, a method for adjusting process variables within an epitaxial chamber includes opening a control valve proximate an optical emission spectrometer, wherein the control valve is arranged in a foreline; flowing one or more precursors into the epitaxial chamber; performing a deposition process within the epitaxial chamber; emitting photons from the epitaxial chamber to the optical emission spectrometer; identifying emission peaks with the optical emission spectrometer; sending input signals from the optical emission spectrometer to a controller; comparing the input signals to stored values using the controller; and adjusting process variables within the epitaxial chamber in real time based on the comparison.

In another embodiment, a method for determining whether to trigger a chamber clean process includes emitting a first series of photons from a process chamber to an optical emission spectrometer; identifying emission peaks with the optical emission spectrometer; sending a first series of input signals from the optical emission spectrometer to a controller; storing the first series of input signals in the controller; closing a control valve proximate the optical emission spectrometer, wherein the control valve is arranged in a foreline; flowing one or more precursors into the process chamber; performing a process within the process chamber; stopping the flow of the one or more precursors; opening the control valve proximate the optical emission spectrometer; emitting a second series of photons from the process chamber to the optical emission spectrometer; identifying emission peaks with the optical emission spectrometer; sending a second series of input signals from the optical emission spectrometer to the controller; storing the second series of input signals in the controller; comparing the first series of input signals to the second series of input signals; and determining whether to trigger a chamber clean process based on the comparison.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following description, numerous specific details are set forth to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring one or more of the embodiments of the present disclosure.

One or more embodiments herein relate to methods for detection using optical emission spectroscopy. In these embodiments, precursor gases are flowed into process chambers where deposition processes are performed. As discussed above, the concentration of the precursor gases are important to semiconductor device performance and film quality. Therefore, measuring the concentration of the precursor gases in an efficient and accurate way is advantageous in semiconductor processing. In these embodiments, optical emission spectroscopy is used to measure precursor gases, reaction products, and residues within a process chamber.

Optical emission spectroscopy uses an optical emission spectrometer (OES) device to measure the concentration of gases. In embodiments described herein, photons are delivered from the process chamber to the OES. The OES identifies emission peaks of the photons, which corresponds to the optical intensity of radiation from the photons, to determine the concentrations of each of the precursor gases and reaction products. The OES sends input signals of the data results to a controller. The controller compares the input signals with stored values and acts to adjust process conditions based on the results.

In these embodiments, the controller can adjust the process conditions in various ways after comparing the input signals and stored values. For example, the controller can adjust process variables within the process chamber in real time during deposition based on the comparison. In other embodiments, the controller can automatically trigger a process chamber clean based on a comparison of input signals of process chamber residues received before the deposition process and input signals of process chamber residues received after the deposition process. As such, the methods described herein advantageously provide an efficient and accurate way to measure the concentration of precursor gases, reaction products, and residues in epitaxial chambers. Accordingly, the process chamber can stay in production during detection.

Figure 1A:
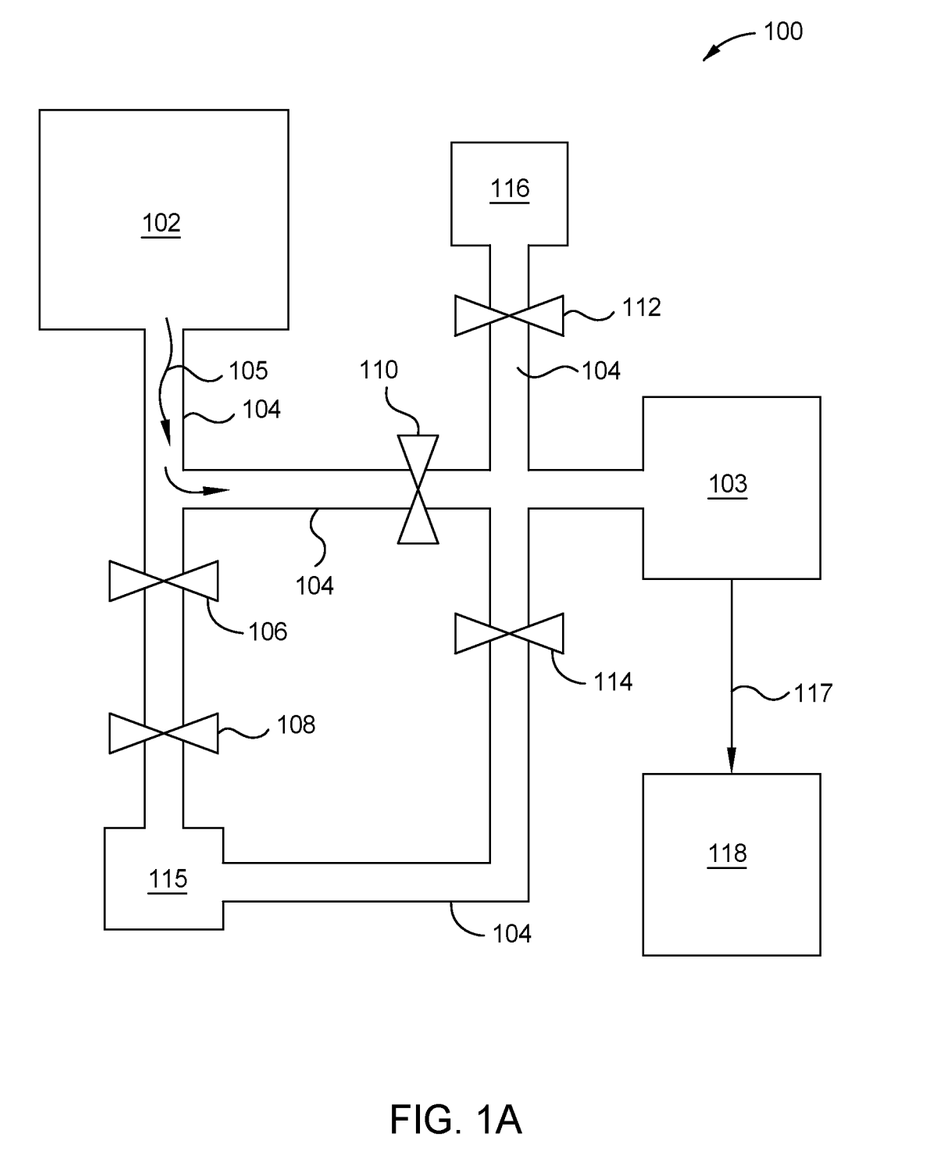
FIG. 1A is a schematic view of a process system according to at least one embodiment described herein.

FIG. 1A is a schematic view of a process system 100 according to at least one embodiment described herein. The process system 100 includes a process chamber 102. In some embodiments, the process chamber 102 is an epitaxial chamber adapted for performing epitaxial silicon deposition processes. However, in other embodiments, other process chambers can also be used and other deposition processes can also be performed. Precursor gases are flowed into the process chamber 102 when performing the deposition processes. The process system 100 also includes an OES 103. The OES 103 is configured to receive photons 105 traveling through a foreline 104 from the process chamber 102. When the OES 103 receives the photons 105, the OES 103 measures the wavelengths of the photons 105 emitted by atoms or molecules during their transition from an excited state to a lower energy state. Each element has a set of characteristic wavelengths which can be used to identify the element. As such, in these embodiments, the OES 103 can be used to detect the elemental composition of gas precursors and reaction products as well as their change in the process chamber 102 during deposition, as well as before and after deposition, as discussed in further detail below.

In these embodiments, the foreline 104 connects the process chamber 102 to a vacuum pump 115. Additionally, the foreline 104 connects both the process chamber 102 and the vacuum pump 115 to a purge gas source 116 and the OES 103. Within the process system 100 are an isolation valve 106, a pressure control valve 108, a control valve 110, a control valve 112, and a control valve 114. Each of the valves act to isolate certain portions of the process system 100 from each other. Additionally, each of the valves can act to regulate the pressure within certain portions of the foreline 104.

For example, in FIG. 1A, the isolation valve 106 is arranged along the foreline 104. When the isolation valve 106 is closed, the isolation valve 106 acts to isolate the process chamber 102 from the pressure of the vacuum pump 115. Additionally, when the isolation valve 106 is closed, the isolation valve 106 acts to isolate the path of the photons 105 such that the photons 105 travel from the process chamber 102 directly through the foreline 104 toward the OES 103. The control valve 110 acts to control when the OES 103 receives the photons 105 traveling through the foreline 104. When the control valve 110 is open, it allows the OES 103 to receive the photons 105 travelling through the foreline 104 from the process chamber 102. When the control valve 110 is closed, it isolates the OES 103 from the process chamber 102. As such, when the control valve 110 is closed, it blocks the OES 103 from receiving the photons 105. Therefore, in the configuration shown in FIG. 1A with the isolation valve 106 closed and the control valve 110 open, the OES 103 is in fluid communication with the process chamber 102 such that the OES 103 detects the gas precursors and reaction products within the process chamber 102, before, during, and/or after deposition. The pressure control valve 108 arranged along the foreline 104 acts to regulate the pressure between the vacuum pump 115 and the process chamber 102.

In some embodiments, the process system 100 includes the purge gas source 116. When the control valve 112 is open, purge gases can flow from the purge gas source 116 into the foreline 104, helping maintain safe conditions within the process system 100. The purge gases can be inert gases and/or cleaning gases. Example purge gases that can be used are $N_2$, $H_2$, or HCl. When the control valve 114 is closed, the control valve 114 acts to isolate the vacuum pump 115 from the purge gas source 116 and the OES 103. However, when the control valve 114 is open, the purge gases from the purge gas source 116 can be pumped from the OES 103. The control valve 114 can also act to regulate the pressure between the vacuum pump 115 and the OES 103.

The process system 100 also includes a controller 118 that receives input signals 117 from the OES 103. The controller 118 is configured to monitor the operation of the process chamber 102 based on the input signals 117 received from the OES 103. The controller may include a central processing unit (CPU), a memory, and support circuits. Software routines can be stored in memory, which may be a random access memory, a read-only memory, floppy disk, a hard disk drive, or other form of digital storage. The software routines can act to adjust process variables within the process chamber 102 based on the comparison of the received input signals 117 with stored values or based on the comparison of different input signals 117 received at different times, as will be discussed in further detail below.

Figure 1B:
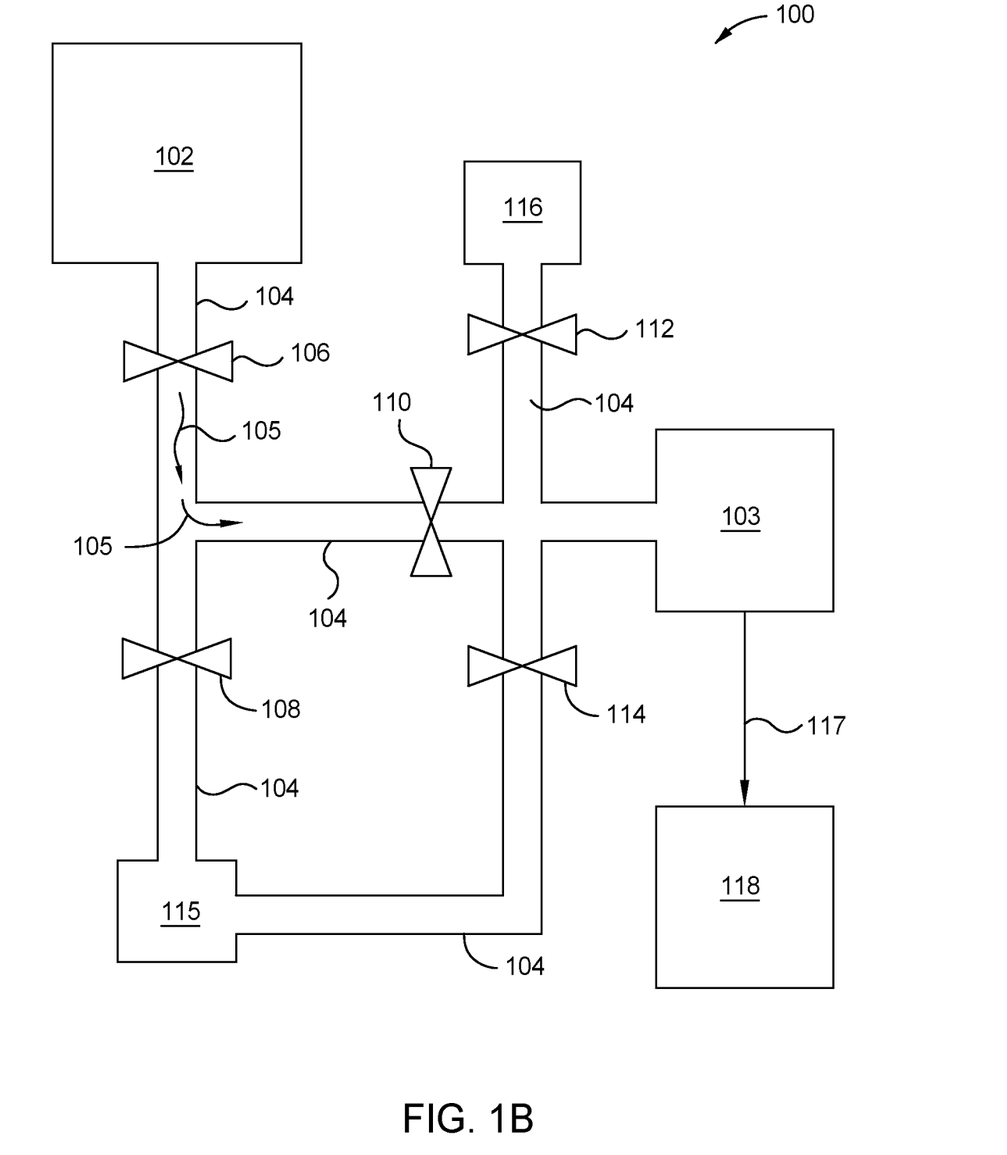
FIG. 1B is a schematic view of a process system according to at least one embodiment described herein.

FIG. 1B is a schematic view of the process system 100 according to at least one embodiment described herein. The at least one embodiment shown in FIG. 1B is similar to the at least one embodiment shown in FIG. 1A. However, in this embodiment, the isolation valve 106 is located further upstream compared to the isolation valve 106 shown in FIG. 1A, such that the process chamber 102 can be isolated from the OES 103. As such, if both the isolation valve 106 and the pressure control valve 108 are closed, and the control valve 110 is open, the photons 105 can be detected in the foreline 104 between the isolation valve 106 and the pressure control valve 108 in isolation from continuing processes being performed in the process chamber 102. Detecting the photons 105 between the isolation valve 106 and the pressure valve 108 allows for the monitoring of the gas precursors and reaction products downstream of the process chamber 102, advantageously allowing for the monitoring of the gas precursors and reaction products at different positions within the process system 100.

Figure 1C:
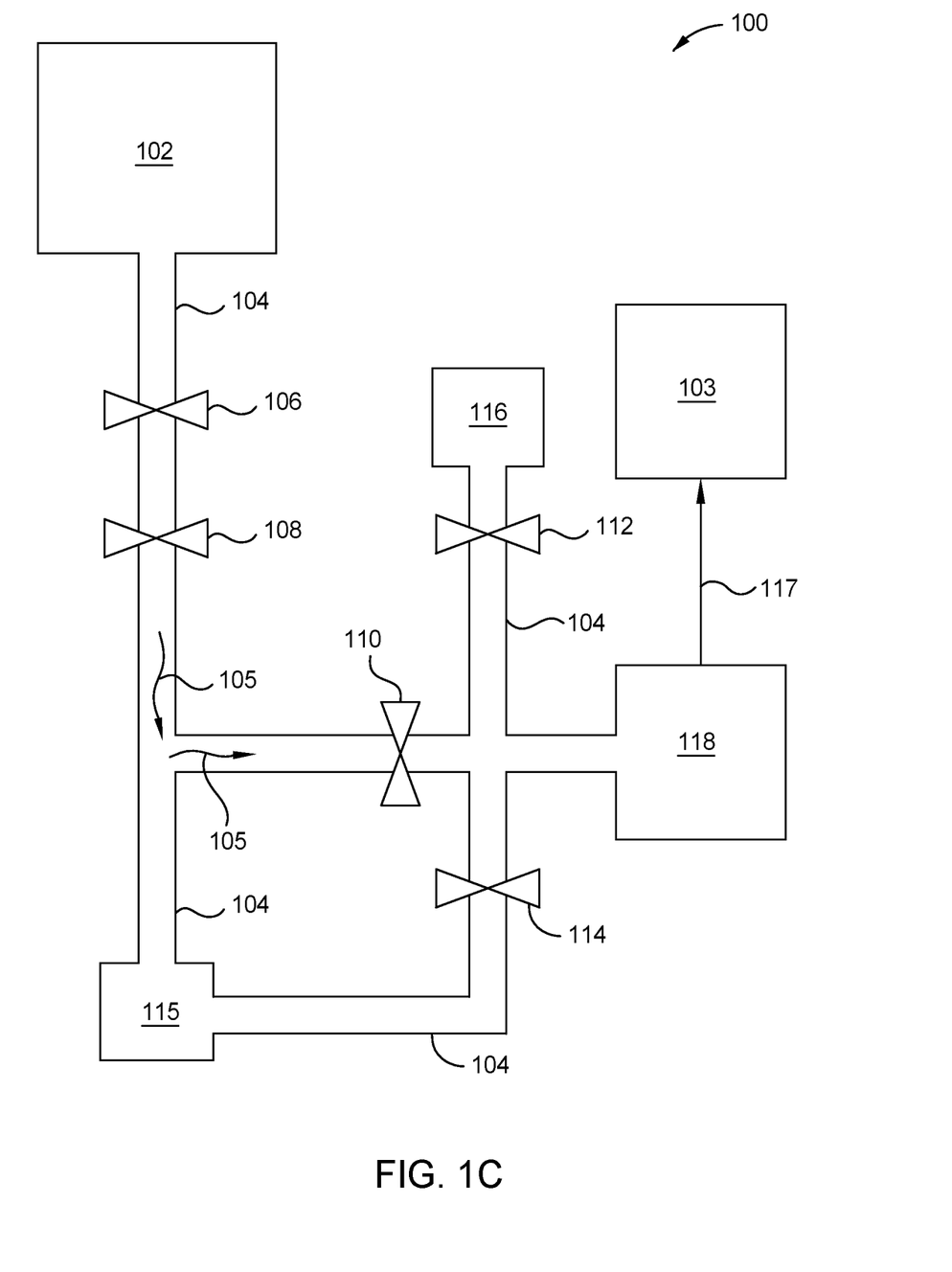
FIG. 1C is a schematic view of a process system according to at least one embodiment described herein.

FIG. 1C is a schematic view of the process system 100 according to at least one embodiment described herein. The at least one embodiment shown in FIG. 1C is similar to the embodiment shown in FIG. 1B. However, in this embodiment, the pressure control valve 108 is located further upstream compared to the pressure control valve 108 shown in FIG. 1B. As such, if both the isolation valve 106 and the pressure control valve 108 are closed, the photons 105 can be detected in the foreline 104 between the pressure control valve 108 and the vacuum pump 115 in isolation from the process chamber 102. Detecting the photons 105 between the pressure control valve 108 and the vacuum pump 115 allows for the monitoring of the gas precursors and reaction products downstream of the process chamber 102 and toward the vacuum pump 115, again advantageously allowing for the monitoring of the gas precursors and reaction products at different positions within the process system 100.

Figure 1D:
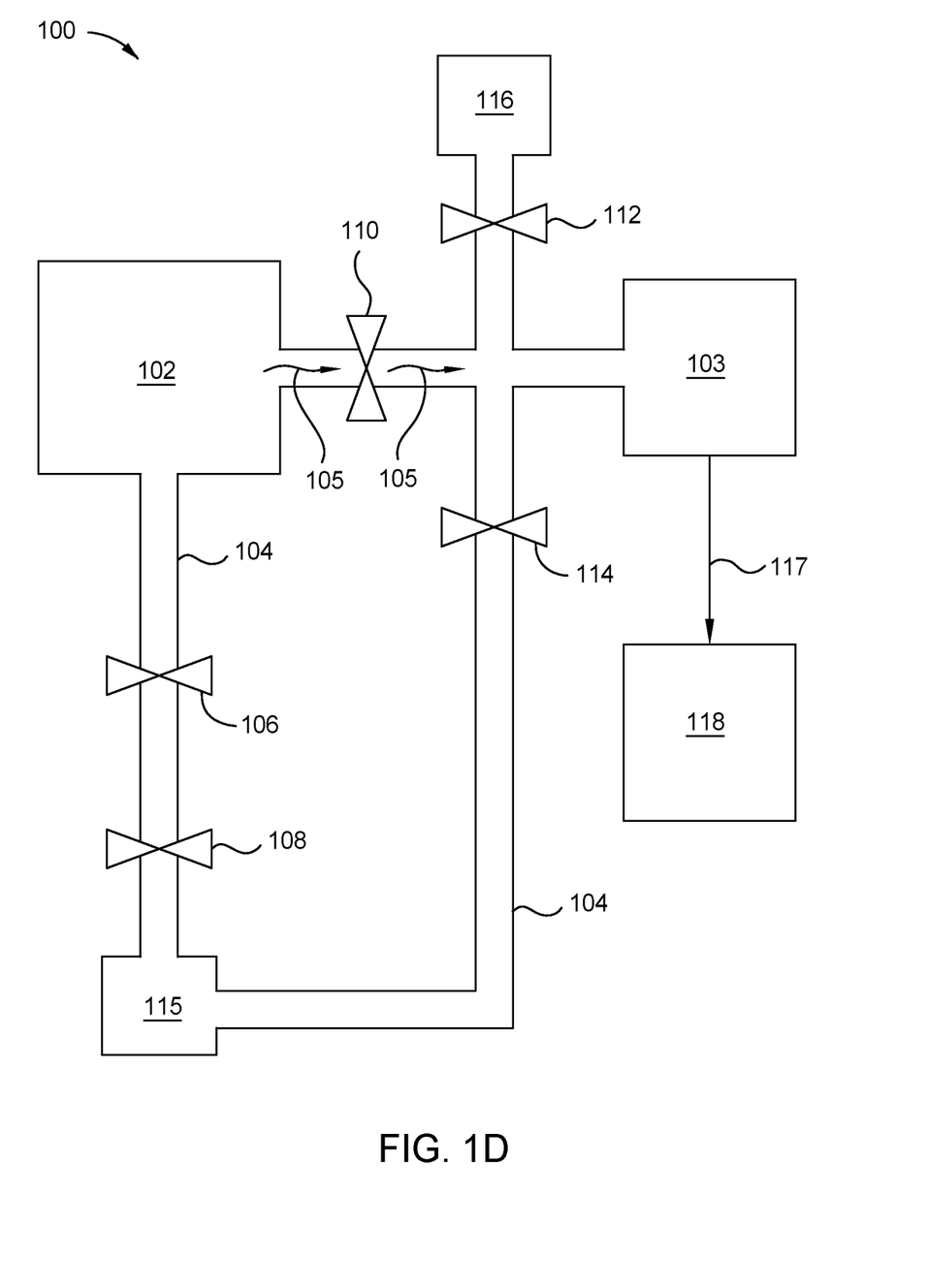
FIG. 1D is a schematic view of a process system according to at least one embodiment described herein.

FIG. 1D is a schematic view of the process system 100 according to at least one embodiment described herein. The at least one embodiment shown in FIG. 1D is similar to the at least one embodiment shown in FIG. 1A. However, in this embodiment, the process chamber 102 and the OES 103 are positioned closer together and directly fluidly coupled with only the control valve 110 separating them. The closer positioning of the process chamber 102 and the OES 103 allows for the photons 105 to flow more directly to the OES 103 when the control valve 110 is open, which can advantageously improve monitoring accuracy. Similar to FIG. 1A, when the isolation valve 106 in FIG. 1D is closed, the isolation valve 106 acts to isolate the path of the photons 105 such that the photons 105 travel directly through the foreline 104 through the opened control valve 110 to the OES 103. Therefore, in the configuration shown in FIG. 1D with the isolation valve 106 closed, the OES 103 is fluidly coupled with the process chamber 102 such that it detects the gas precursors and reaction products within the process chamber 102, either during deposition or before and after deposition.

Figure 1E:
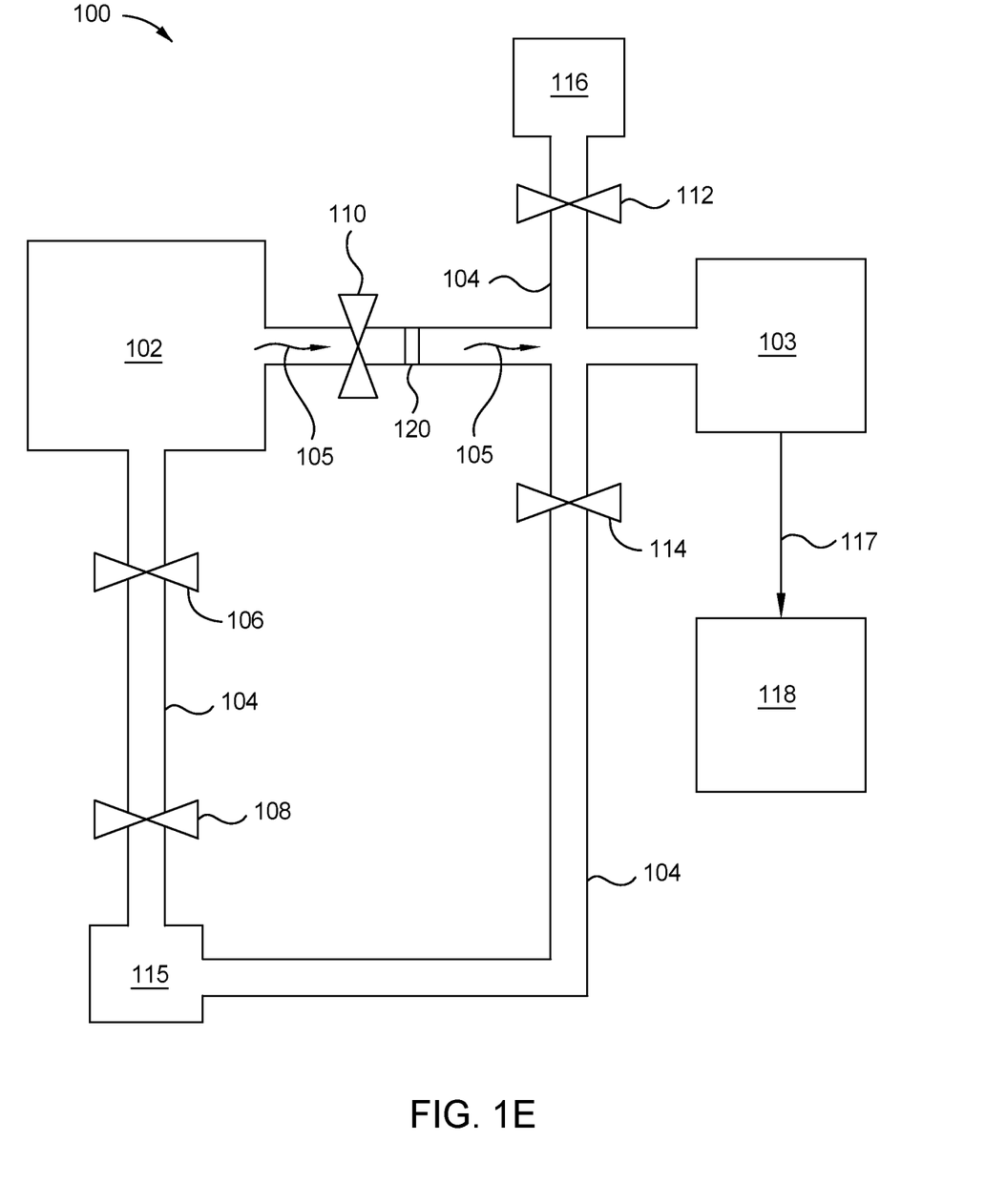
FIG. 1E is a schematic view of a process system according to at least one embodiment described herein.

FIG. 1E is a schematic view of the process system 100 according to at least one embodiment described herein. The at least one embodiment shown in FIG. 1E is similar to the at least one embodiment shown in FIG. 1D. However, in this embodiment, a nozzle 120 is positioned between the process chamber 102 and the OES 103. The nozzle 120 creates a pressure difference to help control the flow of gases between the process chamber 102 and the OES 103. As such, the monitoring of the gas concentrations can be measured by the OES 103 at different flow rates. The gas flow rates can be changed to achieve desired results based on the emission peaks identified by the OES 103, which will be described in further detail below.

Figure 2:
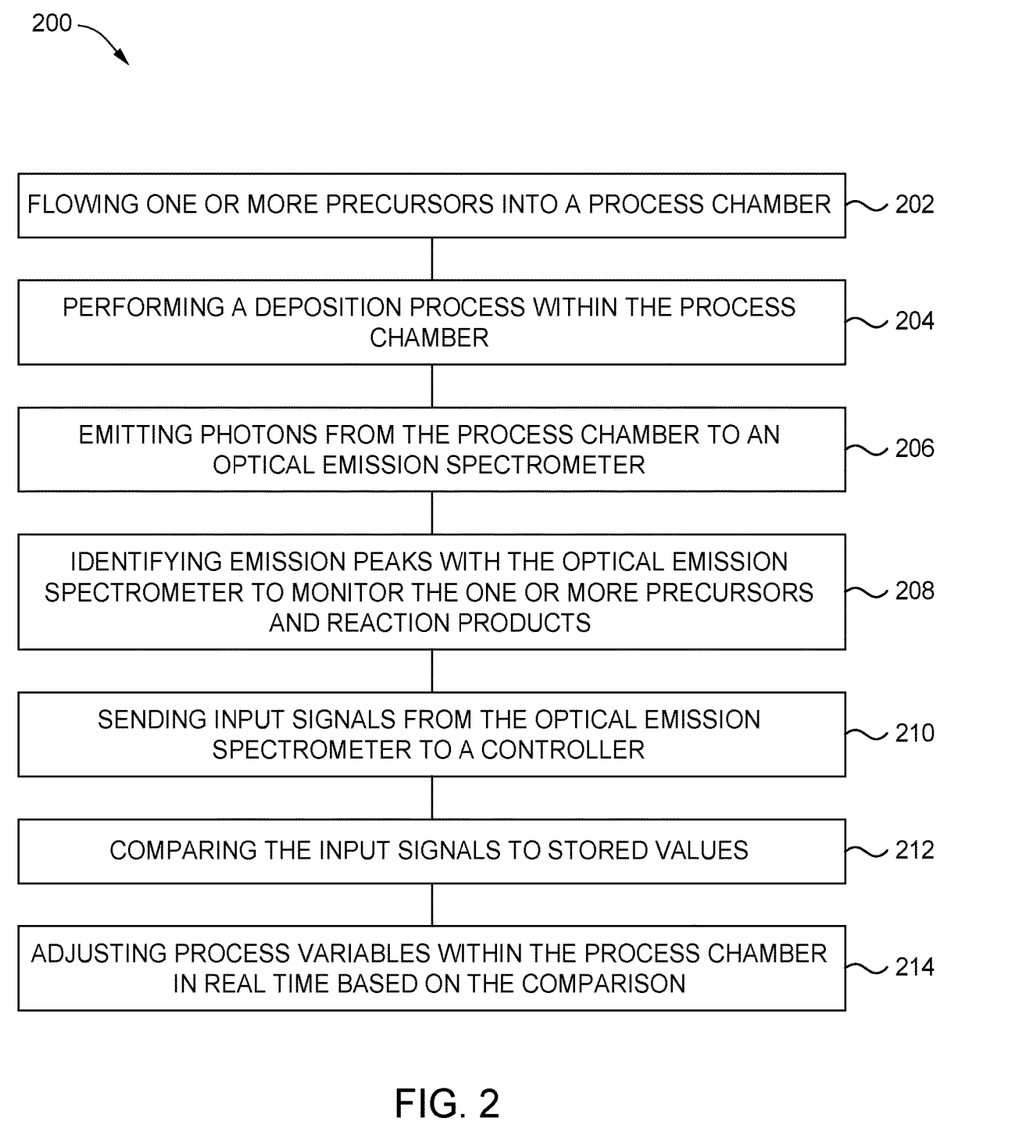
FIG. 2 is a flow chart of a method according to at least one embodiment described herein.

FIG. 2 is a flow chart of a method 200 according to at least one embodiment described herein. In these embodiments, the method 200 is performed with the systems and devices shown in FIG. 1A-1E, but is not limited to these systems and devices and can be performed with other similar systems and devices.

In block 202, one or more precursors are flowed into the process chamber 102. Examples of precursors that can be used are $SiH_4$, $PH_3$, or $HCl$, however many other precursors may also be used. In some embodiments, the process chamber 102 is an epitaxial chamber. However, in other embodiments, other process chambers can also be used. In block 204, a deposition process is performed within the process chamber 102. Epitaxial deposition processes may be performed within the process chamber 102, however other deposition or etch processes may also be performed within the process chamber 102.

In block 206, photons 105 are emitted from the process chamber 102 to the OES 103. When the OES 103 receives the photons 105, the OES 103 measures the wavelengths of the photons 105 emitted by the atoms or molecules during their transition from an excited state to a lower energy state. Each element has a set of characteristic wavelengths which can be used to identify the element. As such, in these embodiments, the OES 103 can be used to detect the elemental composition of gas precursors and reaction products as well as their change in the process chamber 102 during deposition.

In block 208, emission peaks are identified with the OES 103 to monitor the one or more precursors and reaction products within the process chamber 102. The optical intensity of radiation from the photons 105 shows the peaks of well-defined wavelengths for certain atoms of the one or more precursors. For example, the intensity of the peaks of Si, H, P, and Cl atoms of the one or more precursors can be measured to determine the gas concentration. The measurements may be used to determine whether the gas concentrations are changing, have reached plateaus, or have reached predetermined set points during deposition processes.

In block 210, the input signals 117 are sent from the OES 103 to the controller 118. In block 212, the controller 118 compares the received input signals 117 with stored values in memory. In block 214, the process variables are adjusted within the process chamber 102 in real time based on the comparison. Process variables that can be changed include flow rates, pressure within the process chamber 102, and/or the temperature of the process chamber 102. Often, the concentration of the precursors and reaction products drift during deposition. The drift may occur from process variable changes such as a change in flow rates, pressure within the process chamber 102, or the temperature of the process chamber 102. To compensate for the drift, one or more of the other process variables can be changed in real time. The changes can be sent from the controller 118 to the process chamber 102 in real time such that desired gas concentrations are achieved during deposition, improving film quality.

Figure 3:
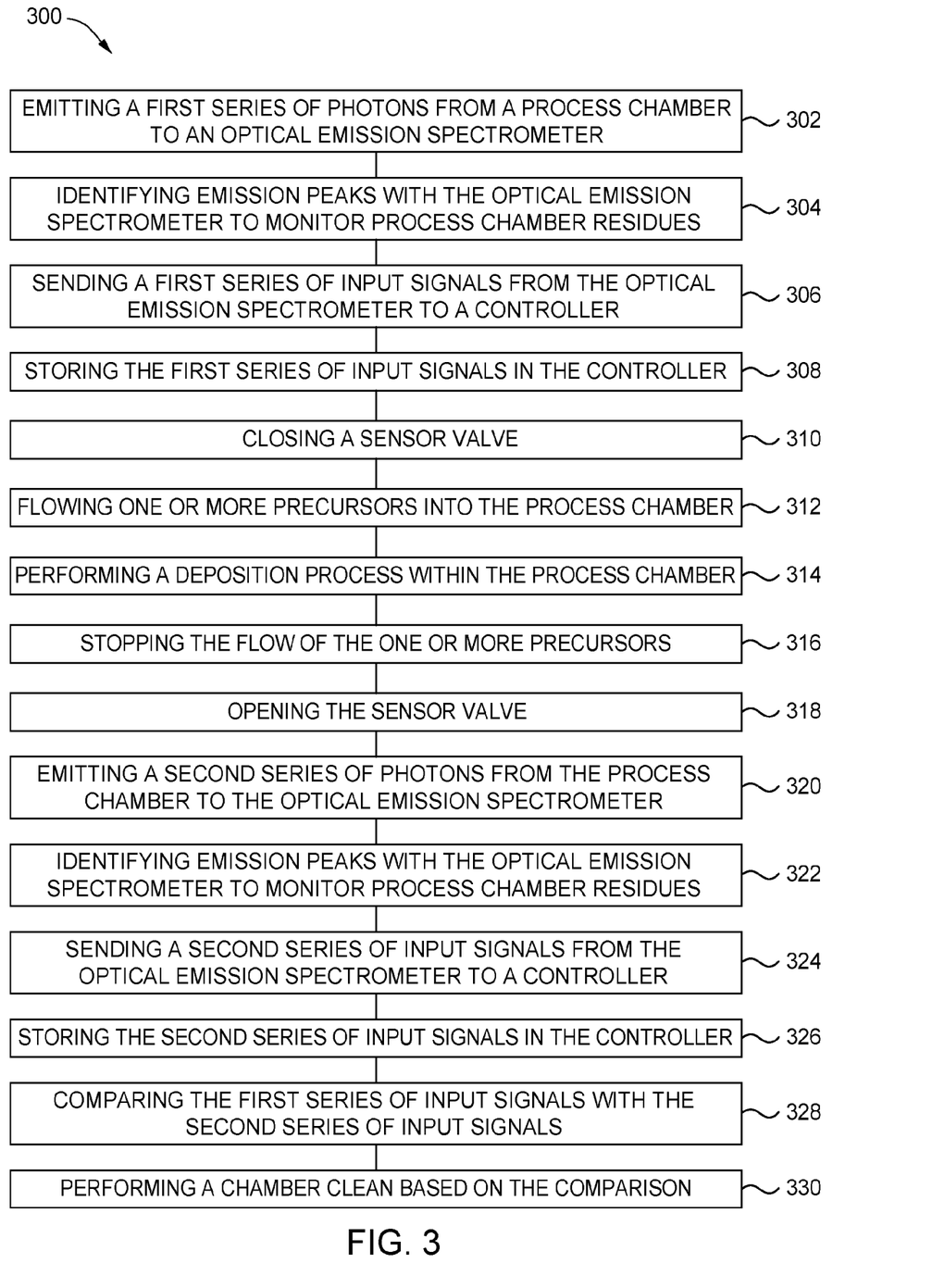
FIG. 3 is a flow chart of a method according to at least one embodiment described herein.

FIG. 3 is a flow chart of a method 300 according to at least one embodiment described herein. In these embodiments, the method 300 is performed with the systems and devices shown in FIG. 1A-1E, but is not limited to these systems and devices and can be performed with other similar systems and devices.

In block 302, a first series of photons 105 are emitted from the process chamber 102 to the OES 103. When the OES 103 receives the photons 105, the OES 103 measures the wavelengths of the photons 105 emitted by the atoms or molecules during their transition from an excited state to a lower energy state. Each element has a set of characteristic wavelengths which can be used to identify the element. As such, in these embodiments, the OES 103 can be used to detect the elemental composition of residues as well as their change in the process chamber 102 before and after deposition.

In block 304, emission peaks are identified with the OES 103 to monitor the residues within the process chamber 102. The optical intensity of radiation from the photons 105 shows the peaks of well-defined wavelengths for certain atoms of the residues. For example, the intensity of the peaks of Si, H, P, and Cl atoms of the residues can be measured to determine the gas concentration. The measurements may be used to determine whether the residues are changing, have reached plateaus, or have reached predetermined set points before and after deposition.

In block 306, a first series of input signals 117 are sent from the OES 103 to the controller 118. In block 308, the first series of inputs signals 117 are stored in the controller 118. In block 310, the control valve 110 is closed. As described above, when the control valve 110 is closed, it blocks the OES 103 from receiving the photons 105. Blocking the OES 103 from receiving the photons 105 in block 310 provides the advantage of preventing the OES 103 from detecting the residue concentrations within the process chamber 102 during deposition. During deposition, the residue concentrations are often too small in comparison with the precursor gases. As such, to do a proper comparison of residues within the process chamber 102, it is preferable to perform the measurements before and/or after deposition.

In block 312, one or more precursors are flowed into the process chamber 102, similar to block 202 described above. Examples of precursors that can be used are $SiH_4$, $PH_3$, or HCl, however many other precursors may also be used. In some embodiments, the process chamber 102 is an epitaxial chamber. However, in other embodiments, other process chambers can also be used. In block 314, a deposition process is performed within the process chamber 102 similar to block 204 described above. Epitaxial deposition processes may be performed within the process chamber 102, however other deposition or etch processes may also be performed within the process chamber 102.

In block 316, the flow of the one or more precursors is stopped, ending the deposition processes. In block 318, the control valve 110 is opened. As described above, when the control valve 110 is open, it allows the OES 103 to receive the photons 105 from the process chamber 102. Therefore, the OES 103 can detect the residue concentrations after the deposition processes have been completed. The vacuum pump 115 can also pump down the process chamber 102 to low pressures, such as below 100 mTorr, which can help to accurately measure the residue concentrations.

In block 320, a second series of photons 105 are emitted from the process chamber 102 to the OES 103. In block 322, emission peaks are identified with the OES 103 to monitor the residues within the process chamber 102. In block 324, a second series of input signals 117 are sent from the OES 103 to the controller 118. In block 326, the second series of inputs signals 117 are stored in the controller 118.

In block 328, the first series of input signals 117 are compared with the second series of input signals 117. In these embodiments, the residue concentrations within the process chamber 102 are compared. The first series of input signals 117 can correspond to the residue concentrations before a deposition process and the second series of input signals 117 can correspond to the residue concentrations after a deposition process. Based on the comparison of the first series of input signals 117 and the second series of input signals 117, in block 330, the controller 118 may trigger a chamber clean to be performed within the process chamber 102. For example, a chamber clean may be triggered if the emission peaks of a certain atom are different by a certain percentage, such as 40% different, 20% different, or 10% different. However, the controller 118 can be configured to trigger a chamber clean based on any set of criteria.

Embodiments described in methods 200 and 300 advantageously allow for the monitoring of gas precursors, reaction products, and residues in real time. Method 200 allows for process variables in the process chamber 102 to be changed in real time to get desired results. Method 300 allows for chamber cleans to be changed automatically to get desired results. Therefore, the inspecting and testing of the process chamber 102 when using methods 200 and 300 is more efficient, preventing the need of the process chamber 102 be taken out of production for manual inspection.

While the foregoing is directed to implementations of the present invention, other and further implementations of the invention may be devised without departing from the basic scope thereof, and the scope thereof is determined by the claims that follow.

We claim:

1. A method for adjusting process variables within a process chamber, comprising:
    flowing one or more precursors into the process chamber;
    performing a deposition process within the process chamber;
    monitoring an elemental composition of the one or more precursors by identifying emission peaks of emitted photons through a foreline with an optical emission spectrometer;
    sending input signals associated with the emission peaks from the optical emission spectrometer to a controller;
    comparing, by the controller, the input signals to stored values; and
    adjusting process variables of the deposition process within the process chamber based on the comparison.

2. The method of claim 1, further comprising closing an isolation valve on the foreline to isolate the process chamber from a vacuum pump.

3. The method of claim 1, further comprising opening a pressure control valve on the foreline to regulate a pressure between the process chamber and a vacuum pump.

4. The method of claim 1, further comprising flowing a purge gas from a purge gas source into the foreline.

5. The method of claim 1, wherein the deposition process is an epitaxial deposition process.

6. The method of claim 1, wherein the one or more precursors include $SiH_4$, $PH_3$, or HCl.

7. The method of claim 1, wherein the process variables include a gas flow rate, a process chamber pressure, and a process chamber temperature.

8. A method for adjusting process variables within an epitaxial chamber, comprising:
    opening a control valve proximate an optical emission spectrometer, wherein the control valve is arranged in a foreline;
    flowing one or more precursors into the epitaxial chamber;
    performing a deposition process within the epitaxial chamber;
    monitoring an elemental composition of the one or more precursors by identifying emission peaks of emitted photons from the epitaxial chamber through a foreline with an optical emission spectrometer;
    sending input signals associated with the emission peaks from the optical emission spectrometer to a controller;

comparing, using the controller, the input signals to stored values; and adjusting process variables within the epitaxial chamber in real time based on the comparison.

9. The method of claim 8, further comprising closing an isolation valve on the foreline to isolate the epitaxial chamber from a vacuum pump.

10. The method of claim 8, further comprising opening a pressure control valve on the foreline to regulate a pressure between the epitaxial chamber and a vacuum pump.

11. The method of claim 8, further comprising flowing a purge gas from a purge gas source into the foreline.

12. The method of claim 8, wherein the one or more precursors include $SiH_4$, $PH_3$, or HCl.

13. The method of claim 8, wherein the process variables include a gas flow rate, a process chamber pressure, and a process chamber temperature.

14. A method for determining whether to trigger a chamber clean process, comprising:
    detecting an elemental composition of a first residue from the process chamber by identifying emission peaks of a first series of photons emitted through a foreline with an optical emission spectrometer;
    sending a first series of input signals associated with the emission peaks of the first series of photons from the optical emission spectrometer to a controller;
    storing the first series of input signals in the controller;
    closing a control valve proximate the optical emission spectrometer, wherein the control valve is arranged in the foreline;
    flowing one or more precursors into the process chamber;
    performing a process within the process chamber;
    stopping the flow of the one or more precursors;
    opening the control valve proximate the optical emission spectrometer;
    detecting an elemental composition of a second residue from the process chamber by identifying emission peaks of a second series of photons emitted through the foreline with the optical emission spectrometer;
    sending a second series of input signals associated with emission peaks of the second series of photons from the optical emission spectrometer to the controller;
    storing the second series of input signals in the controller;
    comparing, by the controller, the first series of input signals to the second series of input signals;
    determining, by the controller, whether to trigger a chamber clean process based on the comparison; and
    triggering, by the controller, a chamber clean when pre-determined criteria between the first series of input signal and the second series of input signals is met.

15. The method of claim 14, further comprising closing an isolation valve on the foreline to isolate the process chamber from a vacuum pump.

16. The method of claim 14, further comprising opening a pressure control valve on the foreline to regulate a pressure between the process chamber and a vacuum pump.

17. The method of claim 14, further comprising flowing a purge gas from a purge gas source into the foreline.

18. The method of claim 14, wherein the deposition process is an epitaxial deposition process.

19. The method of claim 14, wherein the one or more precursors include $SiH_4$, $PH_3$, or HCl.

20. The method of claim 14, wherein the chamber clean is triggered when the pre-determined criteria between the first series of input signal and the second series of input signals is met.

* * * * *